May 29, 1928.

C. A. BODDIE 1,671,463

WATER WHEEL REGULATOR

Filed Nov. 26, 1924

WITNESSES:

INVENTOR
Clarence A. Boddie
BY
ATTORNEY

Patented May 29, 1928.

1,671,463

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

WATER-WHEEL REGULATOR.

Application filed November 26, 1924. Serial No. 752,358.

My invention relates to regulator systems and has special relation to systems for maintaining prime movers at constant speed.

One object of my invention is to provide a regulator system for a prime mover that shall be controlled in accordance with the speed thereof and also in accordance with the load thereon.

Another object of my invention is to provide a system of the above-indicated character which shall control the admission of fluid to the prime mover and shall have means for reacting upon the control mechanism in accordance with the corrective movement of said mechanism.

Another object of my invention is to provide a system of the above-indicated character which shall have means for reacting upon the control apparatus in accordance with the pressure of the motive fluid supplied to the prime mover.

The present invention, while applicable to prime movers, in general, has been illustrated in connection with a system wherein a water wheel is utilized as a prime mover to drive a dynamo-electric machine.

The present invention contemplates providing an electic motor for controlling the movement of the water-wheel gates. This motor operates to control a slide valve governing the inlets to a pressure cylinder which, in turn, controls a pilot valve that governs the main gate.

An electric regulator is provided to govern the operation of the motor. The regulator comprises, essentially, three operating electromagnets interconnected to cooperatively actuate the contact members governing the motor control circuit. One of the control magnets is arranged to be responsive to the speed of the prime mover, another of the control magnets is arranged to be responsive to the voltage of a dynamo-electric machine, and the third electromagnet is connected to be responsive to the load upon the dynamo-electric machine and comprises voltage and current coils.

Anti-hunting means, responsive to the operation of the gate, is provided in the form of a rheostat operated in accordance with movements of the pilot valve, this rheostat being connected in circuit with the voltage coils of the regulator and with the voltage coils of the load-responsive electromagnet.

My invention further contemplates the provision of anti-hunting means responsive to the velocity of water in a penstock. Changes in the velocity pressure within the penstock operate upon a pressure cylinder connected to the motor-operated slide valve to vary the position of this valve oppositely to the motion last given it by the electric motor.

Figure 1:
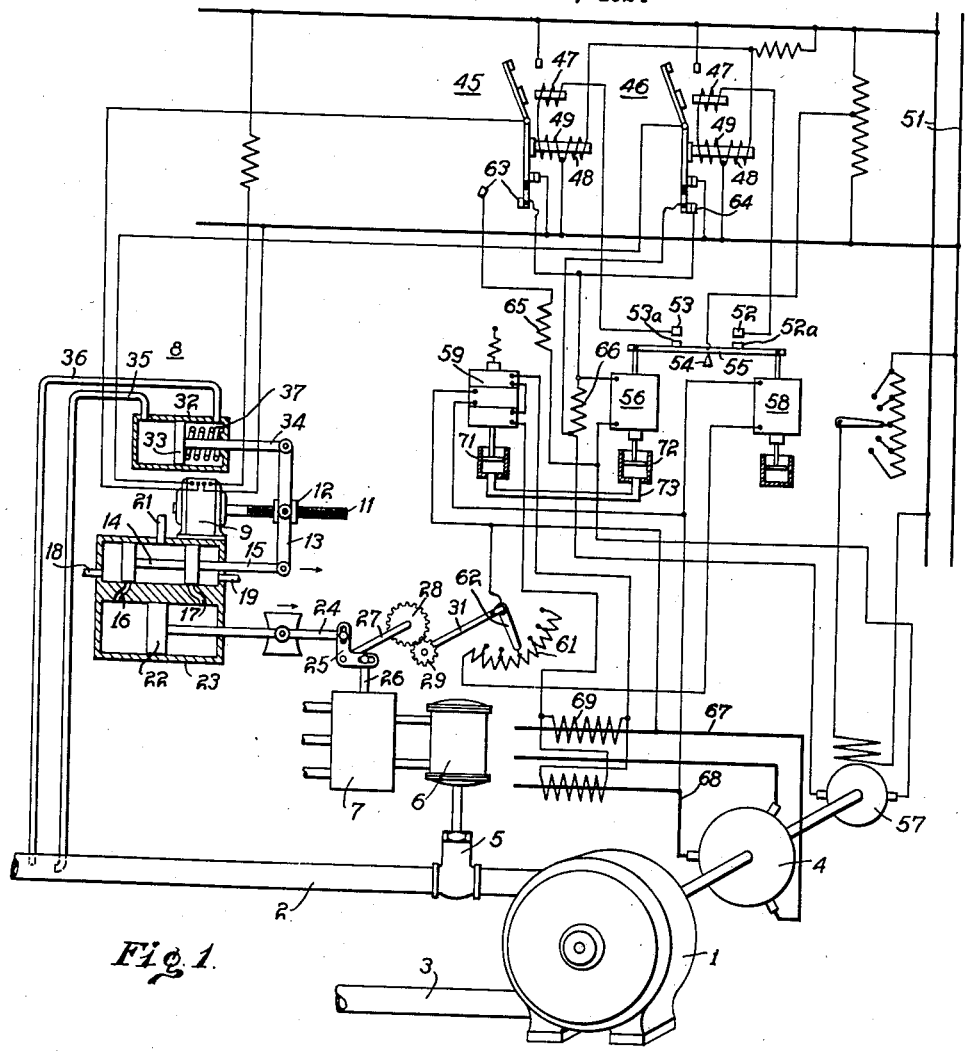
Figure 2:
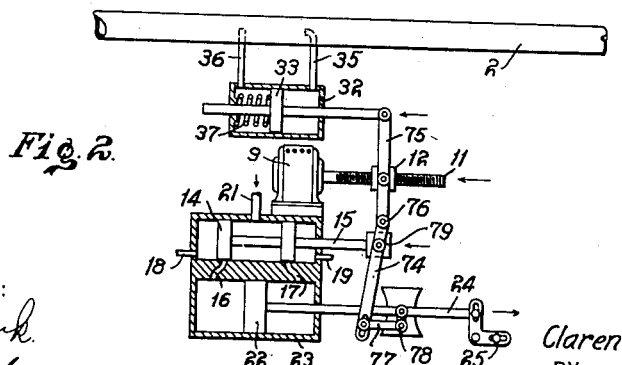

My invention will be better understood by reference to the accompanying drawing, forming a part hereof and in which, Figure 1 is a diagrammatic view of the apparatus and connections used in an embodiment of my invention, and Fig. 2 is a partially elevational and partially sectional view of a modification of the velocity pressure anti-hunting device.

Referring to the drawing, the numeral 1 indicates a water wheel having a penstock 2 and an outlet 3 illustrated as driving a generator 4. The admission of water to the water wheel is controlled by a gate valve 5 provided with a hydraulic operating cylinder 6 that is controlled by the operation of the pilot valve 7.

The pilot valve is governed by a control device, indicated generally at 8, and comprising an electric motor 9 provided with a screw-threaded shaft 11. Upon the shaft 11 is mounted a cooperating screw-threaded nut 12 and pivoted thereto is a floating lever 13. The slide valve 14 is connected by means of a rod 15, to the lower end of the floating lever to control ports 16 and 17, in a manner to be more fully pointed out.

The valve chamber is provided with hydraulic inlets 18 and 19 and an outlet 21 through which fluid flows to increase the pressure on the one or the other side of a piston 22 within the pressure cylinder 23, in accordance with the operation of the valve 14. The piston 22 is directly connected to a rod 24 which, in turn, is connected to the bell-crank lever 25 and to the pilot-valve-operating rod 26. The bell-crank lever also operates a shaft 27 connected by gear wheels 28 and 29 to a shaft 31 which controls the anti-hunting rheostat.

A cylinder 32 is provided with a piston 33 connected to a rod 34 which is pivotally connected to the upper end of the floating lever 13. The respective ends of the cylinder 32 are provided with pipes 35 and 36 leading to the penstock 2, the pipe 35 having a curved end in order that it may serve to transmit pressures that shall be responsive to changes in the velocity pressure of the motive fluid, and the pipe 36 being provided with a straight end in order that the pressures which it transmits shall be responsive to static pressures within the penstock. A spring 37 is provided within the cylinder 32 to press against the piston, the combined action of the spring and the static pressure serving to oppose the velocity pressure within the penstock.

The operation of the motor 9 is controlled by reversing switches 45 and 46, each of which comprises an operating coil 47, a holding coil 48 and a neutralizing coil 49. The holding coil 48 is permanently connected across the circuit conductors 51, and the energizing and neutralizing coils are connected across the conductors 51 through contact members 52—52$^a$ and 53—53$^a$ respectively, of a regulator of the floating-lever type.

The contact members 52$^a$ and 53$^a$ are located on the lever 55, on opposite sides of the pivot 54. Mounted upon one end of the lever 55 is the armature of a control electromagnet 56 that is energized from an auxiliary or pilot generator 57 which is mounted upon the shaft of the water wheel 1 and therefore generates a voltage proportional to the speed of the water wheel. Mounted upon the opposite end of the lever 55 is the armature of a second electromagnet 58 that is energized in accordance with the generator voltage from the conductors 67 and 68, and is in circuit with the resistor 61 and the operating arm 62 of the anti-hunting rheostat that is responsive to the pilot-valve movement.

The reversing switches 45 and 46 are provided with contact members 63 and 64, respectively. The contact members 63, upon engagement, connect a resistor 65 in parallel relation with the operating coil of the magnet 56, and the contact members 64, while in engagement, shunt a resistor 66 in series-circuit relation with the operating coil of the electromagnet 56. The resistors 65 and 66 are controlled by their reversing switches to produce an anti-hunting effect upon the regulators.

The load-responsive coil 59 is provided with three windings, the middle winding being connected in parallel-circuit relation to the coil 58, and the two end windings being connected to the current transformer 69.

The electromagnets 59 and 56 are provided with dashpots 71 and 72, respectively, which are interconnected through a pipe 73 so that the operation of the electromagnet 59 reacts upon the magnet 56 to change the setting of the contact members 52—52$^a$ and 53—53$^a$.

The operation of the system of Fig. 1 is substantially as follows: As the water wheel is started, the speed of the auxiliary or pilot generator 57 is low. Consequently, the energization of the magnet 56 is low and causes the engagement of the contact members 52—52$^a$ or 53—53$^a$, to effect operation of one of the reversing switches 45 and 46 to energize the motor 9 and thus cause it to open the gate valve 5.

As the water wheel increases to normal speed, the energization of the magnet 56 causes the disengagement of the regulator contact members, thus stopping the operation of the motor 9. Should the speed of the water wheel vary above or below its normal speed, the energization of the electromagnet 56 will increase or decrease from its normal balanced value and will again cause the operation of the motor 9 to change the setting of the gate valve the amount necessary to maintain normal operating speed.

The voltage magnet 58 normally balances the pull of the magnet 56 which is affected by variations in voltage from the normal generator voltage to react upon the magnet 56 and thus effect operation of the motor 9.

The electromagnet 59, which is energized in accordance with the power delivered by the generator 4, acts as an anti-hunting means to change the setting of the magnet 56, due to the increase or decrease in generator load, before the effect of such an increase or decrease is felt upon the pilot generator 57, due to the change in water-wheel speed.

As the motor 9 is energized in a direction to cause the opening of the main gate valve 5, the shaft 11 is rotated in a direction to cause a movement of the nut 12 toward the right, thus moving the floating lever 13 and the valve 14 toward the right to open the port 16 and permit the fluid to flow from the inlet pipe 18 into the operating cylinder 23, thus causing the piston 22 to be moved toward the right.

The movement of the piston 22 operates the bell-crank lever 25 in a clockwise direction and forces the pilot valve rod 26 downwardly. At the same time, the bell-crank lever operates the rheostat arm 62 to change the value of resistance in circuit with the voltage coil 58. This change in resistance value causes the regulator to disengage the contact member 52—52$^a$ or 53—53$^a$ thus de-energizing the motor slightly before normal speed conditions have been established.

As the gate valve 5 is opened or closed, the velocity of the motor fluid within the penstock 2 is increased or decreased. The increasing or decreasing velocity pressure within the penstock is transmitted, through the pipe 35, to the left end of the pressure cylinder 32 and acts against the piston 33, in case of an increase in pressure, to move this piston toward the right. The increasing penstock pressure would follow the opening of the gate valve 5, thus forcing the rod 34 to the right and the valve 14 toward the left, and again closing the ports 16 and 17. The velocity pressure within the penstock acts as an anti-hunting means in the operation of the valve 14. Should the motor 9 be energized to operate in the reverse direction to close the gate valve 5, the reverse operation of the control device would be effected.

The control device illustrated in Fig. 2 differs slightly from that of Fig. 1. The piston 33 of the cylinder 32 is connected to a floating lever 75, substantially the middle point of which is connected to the nut 12 and operated in accordance with the operation of the motor 9. The lower end of the floating lever 75 is pivotally connected, at 76 to the floating lever 74, the lower end of which is connected, through rod 77 and pivot 78 to the pilot-valve operating rod 24. The valve rod 15 is connected to the floating lever 74 at point 79.

The operation of the device illustrated in Fig. 2 is as follows: The motor 9, when operated to open the gate valve 5, moves the nut 12 toward the left, thus carrying the floating levers 74 and 75 of the valve 14 toward the left, thereby opening the ports 16 and 17. In this form of the device, the port 21 is an inlet port and the ports 18 and 19 are outlet ports. As the valve 14 is moved toward the left, fluid passes in through the ports 21 and 16 to move the piston 22 toward the right, thus actuating the bell-crank 25 in a clockwise direction, the same as in Fig. 1.

As the rod 24 is moved toward the right, the lower end of the floating lever 74 is also moved toward the right and is effective to partially close the valve 14 as the gate valve 5 is opened, thus permitting an increase of velocity of the motor fluid within the penstock. This increased velocity is registered through the pipe 35, thus actuating the floating lever 75 so that the pivot point 76 is moved toward the right and, therefore, operates to further close the valve 14.

It will be seen, therefore, that, in the device illustrated in Fig. 2, the anti-hunting means operative upon the valve 14 is partially responsive to the operation of a pilot valve and partially responsive to the change in penstock velocity pressures.

Many modifications of the system and in the arrangement and location of parts may be made within the scope of my invention, and such modifications are intended to be covered by the appended claims.

I claim as my invention:

1. In a regulator system, a prime mover, a conduit for conducting fluid to said prime mover, valve means in said conduit for controlling the prime mover, mechanism for controlling the valve means, a motor for actuating said mechanism, electroresponsive regulator means for controlling the operation of said motor, means for energizing said electroresponsive means in accordance with the speed of the prime mover, and anti-hunting means comprising a pressure device actuated by the velocity pressure in said conduit.

2. In a regulator system, a prime mover, a conduit for conducting fluid to said prime mover, valve means in said conduit for controlling the prime mover, controlling mechanism for the valve means, a motor for actuating said mechanism, electromagnet regulator means for controlling said motor, means for energizing said electromagnet regulator means in accordance with the speed of the prime mover, anti-hunting means for modifying the energization of the regulator means, and additional anti-hunting means actuated in accordance with the velocity pressure within said conduit.

3. In a regulator system, a prime mover and a conduit for conducting fluid to said prime mover, valve means in said conduit for controlling the prime mover, controlling mechanism for the valve means, a motor for actuating said mechanism, electromagnetic regulator means for controlling said motor, means for actuating said regulator means in accordance with the speed of the prime mover, and anti-hunting means actuated by the velocity pressure within said conduit.

4. In a regulator system, a prime mover, valve means for controlling the prime mover, controlling mechanism for the valve means, a motor for actuating said mechanism, electromagnetic regulator means for controlling said motor, means for actuating said regulator means in accordance with the speed of the prime mover, anti-hunting means for modifying the magnetization of said regulator means, variable resistor means, and a second anti-hunting means cooperatively connected to said regulator means and influenced by said variable resistor means in accordance with the movement of said controlling mechanism.

5. In a regulator system, a prime mover, a conduit for conducting fluid to said prime mover, valve means in said conduit for controlling the prime mover, controlling mechanism for the valve means, a motor for actuating said mechanism, electroresponsive regulator means for controlling the operation of said motor, means for actuating said regulator means in accordance with the speed of the prime mover, and anti-hunting means actuated by the velocity pressure within said conduit for reacting on said controlling mechanism.

6. In a regulator system, a prime mover, a conduit for conducting fluid to said prime mover, valve means in said conduit for controlling the prime mover, controlling mechanism for the valve means, a motor for actuating said mechanism, electroresponsive regulator means for controlling the operation of said motor, means for actuating said regulator means in accordance with the speed of the prime mover, and a plurality of anti-hunting means, one of said anti-hunting means comprising a pressure device responsive to the velocity pressure within said conduit for reacting on said controlling mechanism.

7. In a regulator system, a prime mover, a conduit for conducting fluid to said prime mover, valve means in said conduit for controlling the prime mover, controlling mechanism for the valve means, a motor for actuating said mechanism, electroresponsive regulator means for controlling the operation of said motor, means for actuating said regulator means in accordance with the speed of the prime mover, and a plurality of anti-hunting means therefor, one of said anti-hunting means comprising a pressure device responsive to the velocity pressure within said conduit for reacting on said controlling mechanism, and another of said anti-hunting means comprising a variable resistor responsive to said controlling mechanism.

8. In a regulator system, a prime mover, a conduit for conducting fluid to said prime mover, valve means in said conduit for controlling the prime mover, controlling mechanism for the valve means comprising a pressure cylinder having an operating rod actuated thereby, valve means associated with said cylinder for controlling the same, a motor for operating said valve, and anti-hunting means actuated by the velocity pressure within said conduit for reacting on said motor-operated valve.

9. In a regulator system, a prime mover, a conduit for conducting fluid to said prime mover, valve means in said conduit for controlling the prime mover, controlling mechanism for the valve means comprising a pressure cylinder having an operating rod actuated thereby, valve means associated with said cylinder for controlling the same, a motor for operating said valve, anti-hunting means actuated by the velocity pressure within said conduit for reacting on said motor-operated valve, and a second anti-hunting means responsive to the movement of said operating rod.

10. In a regulator system, a prime mover, a conduit for conducting fluid to said prime mover, valve means in said conduit for controlling the prime mover, controlling mechanism for the valve means, a motor for actuating said mechanism, electroresponsive regulator means for controlling the motor, means for energizing said electroresponsive regulator means in accordance with the speed of the prime mover, anti-hunting means actuated in accordance with variations in velocity pressure within said conduit, and anti-hunting means actuated in accordance with the movements of said controlling mechanism.

11. In a regulator system, a prime mover, a conduit for conducting fluid to said prime mover, valve means in said conduit for controlling said prime mover, controlling mechanism for said valve means comprising a pressure cylinder having an operating rod actuated thereby, valve means associated with said cylinder for controlling the same, a motor for operating said valve, electroresponsive regulator means for controlling the motor, means for energizing said electroresponsive regulator means in accordance with the speed of the prime mover, anti-hunting means actuated by the velocity pressure within said conduit for reacting on said motor-operated valve, and a second anti-hunting means responsive to the movement of said operating rod.

In testimony whereof I have hereunto subscribed my name this 20th day of November, 1924.

CLARENCE A. BODDIE.